United States Patent [19]

Nielsen

[11] Patent Number: 4,561,842
[45] Date of Patent: Dec. 31, 1985

[54] APPARATUS FOR BURNING PULVERULENT RAW MATERIAL

[75] Inventor: Peter B. Nielsen, Copenhagen, Denmark

[73] Assignee: F. L. Smidth & Co. A/S, Denmark

[21] Appl. No.: 522,396

[22] Filed: Aug. 11, 1983

[30] Foreign Application Priority Data

Sep. 2, 1982 [DK] Denmark ............... 3926/82

[51] Int. Cl.[4] .................................. F27B 7/02
[52] U.S. Cl. .......................... 432/106; 432/14; 106/100
[58] Field of Search ............... 432/14–16, 432/58, 106

[56] References Cited

U.S. PATENT DOCUMENTS

| 3,881,861 | 5/1975 | Ritzmann | 432/14 |
|---|---|---|---|
| 3,986,818 | 10/1976 | Deussner et al. | 432/14 |
| 4,063,875 | 12/1977 | Takeuchi | 432/106 |
| 4,071,309 | 1/1978 | Yamane | 432/106 |
| 4,270,900 | 6/1981 | Shy et al. | 432/106 |
| 4,402,667 | 9/1983 | Goldmann | 432/106 |
| 4,435,159 | 3/1984 | Knudsen | 432/106 |

FOREIGN PATENT DOCUMENTS

| 1406965 | 9/1975 | United Kingdom . |
|---|---|---|
| 1423875 | 2/1976 | United Kingdom . |
| 1428828 | 3/1976 | United Kingdom . |
| 1434091 | 4/1976 | United Kingdom . |
| 1489416 | 10/1977 | United Kingdom . |

OTHER PUBLICATIONS

"Cement-Data Book", by Walter H. Duda, MacDonald and Evans, London, 2nd Edition, 1977, pp. 407–436.

Primary Examiner—Henry C. Yuen
Attorney, Agent, or Firm—Brumbaugh, Graves, Donohue & Raymond

[57] ABSTRACT

An apparatus for burning pulverulent raw material, in particular cement raw meal to cement clinker, has a kiln (1), a cooler (2), a suspension calciner (4–12) and a multi-stage preheater (14–27). The preheater is provided with two material outlet ducts (22 and 22') directing a first stream of preheated material to a suspension burning chamber (4) with a hot air inlet (7) and a fuel inlet (5) and a second stream of preheated material to a kiln gas duct (28), respectively. Rapid quenching of kiln gas and accelerated rate of combustion in suspension calciner are provided by suspending and calcining the material in the streams in the burning chamber and the kiln gas duct, respectively, and uniting the two suspensions downstream of the suspension burning chamber (4). The calcined material is precipitated in and passed to the kiln from a precipitator (9), to which the united suspensions are directed.

6 Claims, 3 Drawing Figures

APPARATUS FOR BURNING PULVERULENT RAW MATERIAL

The present invention concerns an apparatus for burning pulverulent raw material, the apparatus comprising a preheater, a suspension calciner assembly, a kiln, and an air cooler.

The apparatus may be used e.g. in the production of cement, i.e. when the pulverulent raw material is cement raw meal, in particular Portland cement raw meal with an oxide analysis on an ignition free basis within the ranges CaO:60–67% by weight, $SiO_2$: 17–25% by weight, $Al_2O_3$: 3–8% by weight, $Fe_2O_3$: 0.5–6% by weight, MgO: 0.1–5.5% by weight, $Na_2O + K_2O$: 0.5–1.3% by weight and $SO_3$: 1–3% by weight; or for converting complex aluminium silicates to dicalcium silicate and water soluble aluminates by the lime or the lime/soda process.

The apparatus is particularly suitable for burning cement raw meal, especially Portland cement raw meal to cement clinker by the dry process.

Manufacture of cement clinker takes place in 4 phases:

(1) Preheating pulverulent raw material to about 750° C.
(2) Calcining preheated pulverulent raw material at about 850° C.
(3) Heating calcined raw material to sintering temperature and sintering to cement clinker at about 1400° C.
(4) Cooling the cement clinker to about 100° C.

Originally the first three phases were performed in a long rotary kiln.

A decisive improvement in the heat economy of the cement production process was achieved by the invention of the multi-stage, in particular four stage, raw meal suspension preheater connected to a shorter rotary kiln. In this apparatus phase (1) is performed in the suspension preheater, phase (3) in the rotary kiln and phase (2) partially in the suspension preheater and partially in the rotary kiln.

Another important improvement of the cement production process, in particular providing improved control of the sintering process, was achieved by the invention of the suspension calciner, in which the preheated raw meal is calcined suspended in a burning gas.

According to the present state of art it is considered advantageous to carry out the 4 phases in separate devices, viz.(1) in a multi-stage suspension preheater, (2) in a suspension calciner with a separate fuel supply and comprising a calcination burning chamber connected to a particle precipitation chamber, (3) in a rotary kiln with separate fuel supply and (4) in an air cooler, the exit air of which is used when burning fuel in the calciner and rotary kiln, while exit gas from phase (2) and/or (3) is used as the heat source in the preheater. However, many operating cement production plants are still of the above mentioned type with a four stage suspension preheater connected to a rotary kiln, i.e. without a separate calciner.

The term "suspension" may indicate a two-phase system consisting of a finely divided solid dispersed in a solid, liquid or gas. However, in the present specification the term "suspension" is intended to indicate a gas/particle suspension, i.e. a two-phase system consisting of a finely divided solid dispersed in, and entrained by, a stream of gas.

Numerous proposals for cement production plants comprising a multi-stage suspension preheater, suspension calciner rotary kiln and cooler for burning pulverulent cement raw materials in suspension have been made, and a number thereof have been successfully implemented on a large industrial scale.

A comprehensive survey of layouts for modern industrially utilized cement production plants may be found in Walter H. Duda, CEMENT-DATA BOOK, MacDonald and Evans, 2nd Edition, 1977, pages 407–436.

Here it need only be mentioned that the layouts may comprise two string preheaters with two parallel arrays of cyclones one with kiln exhaust gas as heating gas and the other with calciner exhaust gas as heating gas, known from GB-A-1,434,091, or one string preheaters with a mixture of kiln and calciner exhaust gas as heating gas. In the latter case kiln gas and calciner gas may be mixed in the calciner or after the calciner gas has passed through the particle precipitator of the calciner.

The mixing of kiln gas and calciner gas in the calciner is in most cases achieved by mixing kiln gas and hot air in or upstream of the burning chamber of the calciner or by operating the kiln with a considerable hot air surplus, i.e. providing a mixture of hot air and kiln gas in the kiln, and introducing this mixture into the burning chamber of the calciner. Such plants are for instance known from GB-A-1,428,828, 1,423,875, 1,489,416 and 1,406,965.

As fuel for the calciner and kiln, all types of gas, oil and pulverized coal may be used, but due to increases in prices of gas and oil, the use of pulverized coal, in particular coal dust with a fineness corresponding to a residue of 10–30% on a 90 micron sieve, has attracted increasing interest.

Experience, however, has shown that not all types of pulverized coal are equally suited as calciner fuel.

In particular pulverized coal with a content of volatile matter (determined according to ASTM Standard D3175) below 30%, pulverized coal with a broad particle size distribution, and/or pulverized coal having a considerable amount of coarse particles, may present difficulties due to lack of total burning out of, in particular, the coarse coal particles. This may show itself partly as undesirable burning in the particle precipitator and partly as undesirable occurences of unburnt coal in the calcined product withdrawn from the particle precipitator.

Also when natural gas is used as calciner fuel corresponding difficulties may occur due to too slow gas combustion velocity at the calcining temperature.

There is disclosed in U.S. Pat. No. 4,071,309 an apparatus (hereinafter referred to as of the kind described) comprising:

a preheater with an inlet and an outlet for heating gas, an inlet for pulverulent raw material, and first and second outlet ducts for first and second streams of preheated raw material respectively;

a suspension calciner assembly having an inlet for combustion gas, a suspension burning chamber provided with inlets for fuel and hot air and with a preheated raw material inlet connected to the first duct, a particle precipitator which has a kiln gas suspension inlet, an outlet for calciner exhaust gas connected to the heating gas inlet of the preheater and an outlet duct for calcined material, a kiln gas duct provided with a material inlet connected to the second duct and connecting the combustion gas inlet with the kiln gas suspension inlet of the particle precipitator, and a suspension transfer duct leading from the burning chamber to the subassembly comprising the kiln gas duct and precipitator whereby, in use, the two material streams are reunited in suspension and precipitated together in the precipitator;

a kiln having an upper end with a material inlet connected to the calcined material outlet duct of the precipitator and an exhaust gas outlet connected to the combustion gas inlet of the calciner assembly, and a lower end with inlets for fuel and hot air and an outlet for burned material; and, an air cooler having a material inlet connected to the lower end of the kiln, an inlet for cooling air, an outlet for cooled material and two outlets for hot air connected to the hot air inlet of the burning chamber and the lower kiln end respectively.

In this construction the calciner burning chamber is supplied with fuel and air. It has been found that it is possible to reduce the burning out time for natural gas, and even for difficult types of coal, compared to the burning out time in plants in which a mixture of hot air and kiln gas is introduced into the burning chamber of the calciner, presumably because of the higher oxygen concentration of the gas introduced into the burning chamber.

However, in the apparatus described in U.S. Pat. No. 4,071,309, the suspension transfer duct leads into the kiln gas duct upstream of the material inlet at which the second stream of material is discharged into the kiln gas duct. A serious problem of bakings in the upstream end of the kiln gas duct occurs as a result.

The object of the invention is to overcome this problem and to provide an apparatus which can easily be constructed by rebuilding an existing plant, particularly a cement production plant, which has a multi-stage cyclone suspension preheater connected to a rotary kiln, but no separate calciner.

According to the present invention, an apparatus of the kind described is characterized in that the suspension transfer duct is connected to the sub-assembly of kiln gas duct and precipitator downstream of the material inlet of the kiln gas duct.

In operation, the first stream of pulverulent raw material is suspended in the gas stream in the burning chamber, and calcined, if desired almost completely. The reaction velocity for the reaction between fuel and oxygen is sufficiently high to ensure complete burning out of gas and even of difficult types of coal. The second stream of pulverulent raw material is introduced into and suspended in the kiln gas leaving the kiln, upstream of where the hot material which has been treated in the burning chamber is introduced, providing a rapid quenching of the kiln gas. This is very important in reducing bakings in the upstream end of the kiln gas duct. Practically any desired degree of calcination of the second stream of pulverulent raw material, i.e. any desired degree of calcination of the calcined product withdrawn from the particle precipitator, can be achieved, depending on the mass ratio between the first and the second streams of pulverulent raw material.

The burning chamber of the calciner may be operated at temperatures normally maintained in suspension calciners, i.e. within the range 830°-1050° C., preferentially 850°-950° C., but if desired at temperatures which are 100°-300° C. higher than according to normal calcining conditions without meeting problems of overheating, hot spots, and bakings.

The gas retention time in the burning chamber is typically within the range 0.5–5, preferentially 1–3 seconds. A typical degree of calcination of the first stream of material withdrawn in suspension from the burning chamber is 70–100%, preferentially 85–98%.

A typical degree of calcination of the second stream of material calcined suspended in kiln gas is 50–100%, preferentially 60–90%.

The temperature of the calciner exhaust gas withdrawn from the particle precipitator and introduced into the preheater is typically 850°–950° C.

The preheater is preferentially a multi-stage suspension preheater. In particular preheaters comprising three or four cyclone stages are preferred. The material is preheated to a temperature within the range 500°–850° C., preferentially within the range 600°–830° C.

The kiln is preferentially a short rotary kiln, i.e. one less than 50 m. long.

As fuel for the calciner and kiln there may be used liquid fuels, such as fuel oil, gaseous fuels, such as natural gas, and solid fuels, such as pulverized coal.

The dividing of the preheated pulverized raw material into two streams may be provided by known methods, e.g. by means of dividing dampers or by dividing a suspension of the material into two streams and directing the two streams to separate precipitation cyclones in the preheater.

A preferred mass ratio between the first and the second streams of pulverulent raw material is within the range 15–1.

In contrast to many other plants comprising preheater, calciner and kiln the apparatus according to the invention allows an extremely simple up start. Thus, at the beginning all material from the preheater is introduced into the kiln gas duct and neither fuel, nor material nor air is directed to the suspension burning chamber, i.e. at the beginning the apparatus is operated as a kiln with a preheater but no calciner. After some time hot clinker arrives at the air cooler, and when the hot air from the cooler has obtained a temperature of about 700° C., the first stream of material from the preheater and fuel may gradually be directed to the suspension burning chamber.

In one construction the suspension burning chamber is a tubular chamber having an upright axis, an annular bottom wall which slopes downwardly and inwardly, a central inlet for hot air in the bottom, the inlets for the fuel and raw material being arranged to discharge fuel and the first stream of raw material onto the bottom of the burning chamber, and a suspension outlet opening at the top of the burning chamber connected to the suspension transfer duct. This construction ensures a particularly efficient combustion of the fuel and a particularly efficient suspension of the first stream of pulverulent raw material.

The kiln gas duct may be provided with a tubular retention chamber having an upright axis, an annular bottom wall which slopes downwardly and inwardly, a central inlet for kiln gas in the bottom, and a suspension outlet opening at the top of the retention chamber connected to the particle precipitator; the material duct opening of the kiln gas duct being arranged between combustion gas inlet and the retention chamber or at the bottom of the retention chamber; and the suspension transfer duct being connected to the kiln gas duct between the combustion gas inlet and the retention chamber or at the bottom of the retention chamber. The suspension transfer duct preferentially leads tangentially into the bottom of the retention chamber, but it may also extend between the retention chamber and particle precipitator. The gas retention time in the retention chamber is typically 0.3–3 seconds.

The kiln gas duct may be provided with a throttle in order to maintain a suitable division of hot air between kiln and calciner. The gas flow resistance of the throttle is made somewhat larger than that of a hot air pipe connecting the air cooler and the hot air inlet of the suspension burning chamber. The material inlet opening of the kiln gas duct may be arranged downstream, but in order to eliminate the risk for formation of bakings in the riser pipe preferentially upstream of the throttle.

Alternatively, the mass ratio between the hot air streams directed to the suspension burning chamber and to the rotary kiln, respectively may be controlled by means of a valve arranged in the hot air pipe.

The kiln gas duct may be provided with a supplementary fuel inlet, preferentially arranged close to the material inlet opening of the kiln gas duct. The supplementary fuel inlet may alternatively be arranged at the bottom of the retention chamber. A surplus of hot air is then drawn through the kiln and a large amount of preheated material may be calcined in the kiln gas duct by the heat produced by burning the supplementary fuel.

When supplementary fuel is introduced into the kiln gas duct the mass ratio between the first and the second stream of preheated pulverulent raw material is preferentially within the range 7–1. When no supplementary fuel is introduced the mass ratio is preferentially 15–5.

Existing kiln plants with a multi-stage suspension preheater connected to a rotary kiln, but no separate calciner can very easily be converted to an apparatus according to the invention.

Thus the invention also includes a method of converting a plant for burning pulverulent raw material, the plant being of the kind comprising a multi-stage cyclone preheater in which pulverulent cement raw material is preheated by exhaust gas from a kiln, and from the lowermost cyclone stage of which the material is fed to the kiln for burning and thereafter to an air cooler connected to the kiln for cooling of the burned material, the kiln exhaust gas passing from the kiln to the lowermost cyclone stage via a riser pipe to which the material is fed from the penultimate cyclone stage; the method comprising providing the plant with a calciner burning chamber having a fuel inlet, and an air inlet connected to the cooler so that waste cooling air is fed to the burning chamber; a suspension transfer duct leading from the burning chamber to the riser pipe downstream of the material feed to the riser pipe, or to the lowermost cyclone stage; and means for dividing the material leaving the penultimate cyclone stage and for feeding the two streams of material one into the burning chamber and the other into the riser pipe whereby, in use of the converted plant, the two streams of material are separately calcined in suspension and mixed for precipitation in the lowermost cyclone stage, from which the reunited stream of material is fed to the kiln.

Three examples of cement production plants constructed in accordance with the invention are illustrated diagrammatically in the accompanying drawings, in which.

Figure 1:
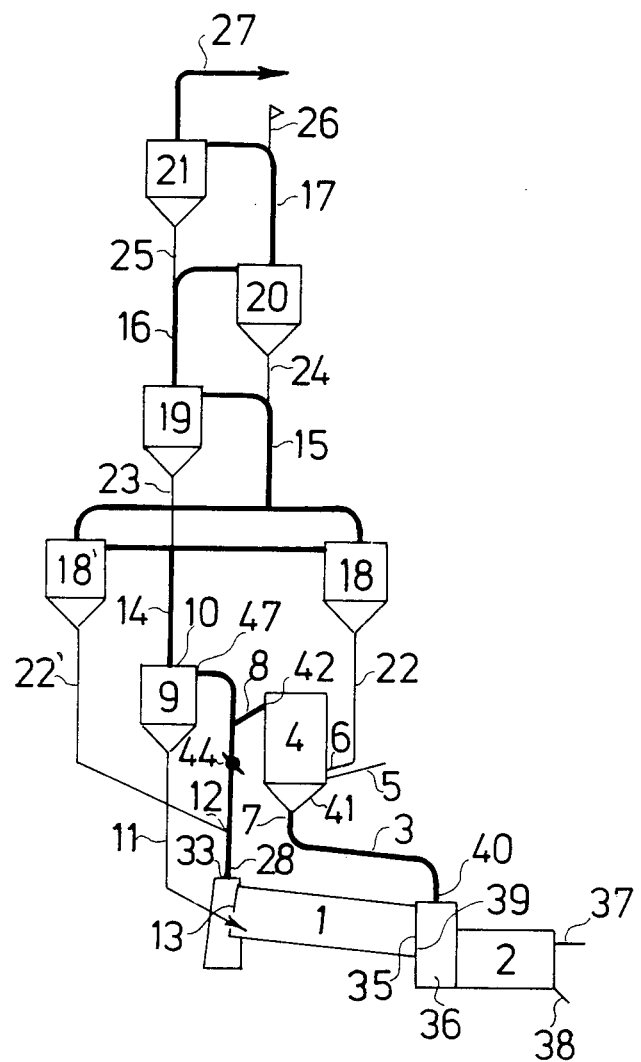
FIG. 1 shows one plant where the suspension transfer duct from the burning chamber is connected to an opening in the kiln gas duct.

The same reference are used for similar parts in the different figures. The plant has a rotary kiln 1 provided with a burner which is not shown and connected to an air cooler 2. The kiln has an upper end 13 forming a material inlet and a kiln exhaust gas outlet, and a lower end 35 providing both an inlet for fuel and hot air and an outlet for burned material. The burned material outlet 35 of the kiln is connected to a material inlet 36 of the cooler which has an outlet 38 for the material after cooling. The cooler 2 has an inlet 37 for cooling air and two waste hot air outlets 39 and 40 which are connected to the kiln hot air inlet 35 and to a pipe 3, respectively. The pipe 3 leads part of the cooler exit air to a calciner assembly comprising a suspension burning chamber 4 with inlets for fuel 5, a first stream of pulverulent raw material 6, and hot air 7 and provided with a suspension outlet transfer duct 8 connected directly or indirectly to a particle precipitator cyclone 9. The cyclone 9 has a calciner exhaust gas outlet 10 and an outlet duct 11 for calcined material leading the calcined material to the material inlet 13 of the rotary kiln 1. The calciner assembly is further provided with a kiln gas duct 28 leading to a suspension inlet 47 of the cyclone 9 and having a combustion gas inlet 33 connected to the kiln exhaust gas outlet 13, and an inlet opening 12 for a second stream of pulverulent raw material.

The calciner exhaust gas outlet 10 provides preheating gas to a multi-stage cyclone preheater comprising riser pipes 14, 15, 16, and 17 leading to cyclones 18, 18', 19, 20 and 21, respectively, which are provided with material outlet ducts 22, 22' (or 22''), 23, 24, and 25, respectively. The preheating gas is provided by exhaust gas from the burning chamber 4, and from the kiln 1 via the kiln gas duct 28. The multi-stage cyclone preheater is further provided with a material inlet duct 26 and an exit gas outlet 27 provided with a filter and ventilator not shown.

In operation, the pulverulent raw material is inttoduced into and preheated in the preheater from which the two streams of preheated pulverulent raw material are withdrawn either from cyclones 18 and 18', respectively, or by dividing the stream from cyclone 18. The two streams of preheated pulverulent raw material are introduced into the calciner assembly and calcined in suspended state in the suspension burning chamber and the kiln gas duct, respectively. The two suspensions are directed to the cyclone 9. The calcined material is precipitated in the cyclone 9 and directed to the rotary kiln 1, where it is subjected to further heat treatment as described above, and the calciner exhaust gas withdrawn from the cyclone 9 is directed to the preheater as heating gas.

In the plant shown in FIG. 1, the division of the raw meal is performed in the last preheating step, where the riser pipe 14 is divided into two branches directed to cyclones 18 and 18', respectively. The mass ratio between the two streams may be controlled by means of a not shown damper or valve arranged in the gas outlet duct of cyclone 18.

The burning chamber 4 is a tubular chamber having an upright axis, an annular bottom wall 41 which slopes downwardly and inwardly with the hot air inlet 7 centrally positioned. Through the inlet 5 is discharged fuel and through the inlet 6 is discharged the first stream of material from the duct 22 both onto the bottom of the chamber. A suspension outlet opening 42 at the top of the chamber is connected to the transfer duct 8. The first stream of preheated pulverulent raw material is via the material outlet duct 22 and the inlet 6, introduced into the suspension burning chamber. The second stream of pulverulent raw material is, via the material outlet duct 22' and the inlet 12, introduced in the kiln gas duct 28 where it is suspended in the kiln exit gas, providing a desirable quenching of the kiln gas and reducing the risk of bakings at the kiln gas outlet. This pulverulent raw material/kiln gas suspension is mixed with the suspension passing through the transfer duct 8. The mixed suspensions are directed to the cyclone 9 having the exit gas outlet 10 connected to the riser pipe 14.

Figure 2:
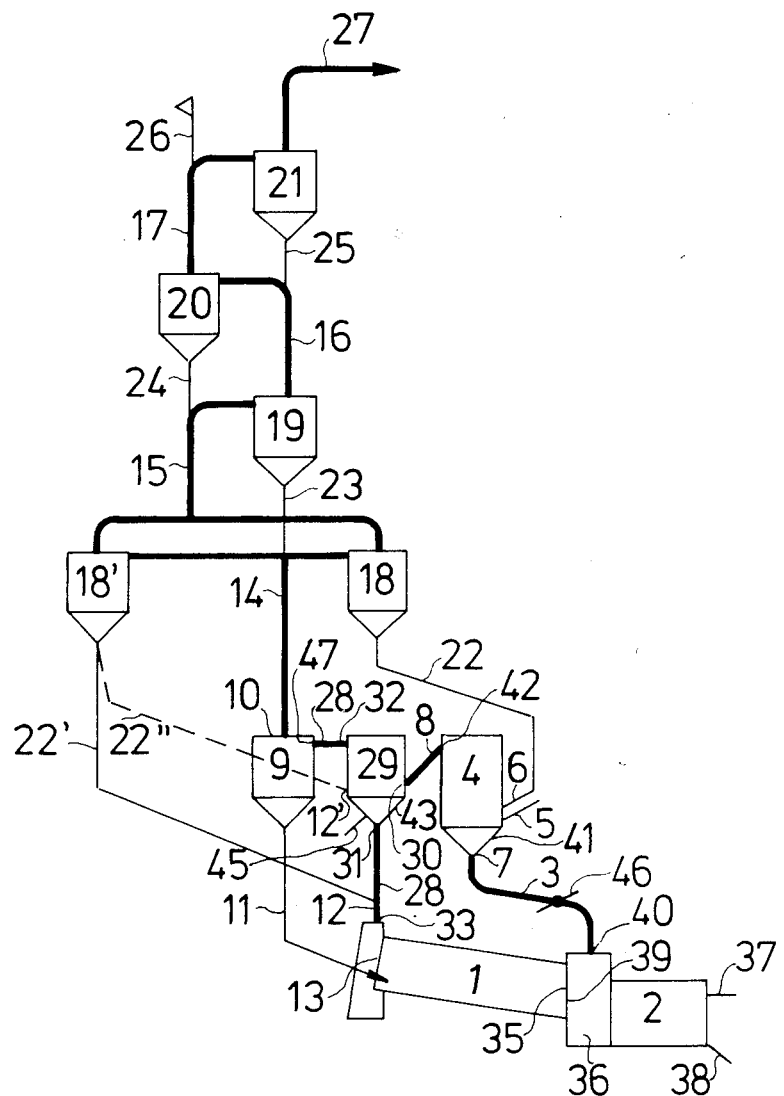
FIG. 2 shows a similar plant where the kiln gas duct is provided with a tubular retention chamber; and, FIG. 3 shows a similar plant where the suspension transfer duct is connected to a second suspension inlet opening in the particle precipitator.

In the plant shown in FIG. 2, the preheater and the suspension burning chamber are of the same construction as in FIG. 1. The first stream of preheated pulverulent raw material is withdrawn from the cyclone 18 through the material outlet duct 22 connected to the suspension burning chamber. The second stream of preheated pulverulent raw material is withdrawn from the cyclone 18' via a material outlet duct 22' (or 22") and directed to the kiln gas duct 28 via the inlet 12 and suspended in kiln exhaust gas. The kiln gas duct 28 is provided with a tubular retention chamber 29 having an upright axis and an annular bottom wall 43 which slopes downwardly and inwardly with a central inlet 31 for the kiln gas. The chamber has an inlet 30 for the suspension coming from the suspension burning chamber arranged in the bottom of the retention chamber, the suspension transfer duct 8 being connected to the inlet 30. The retention chamber 29 is further provided at the top with a suspension outlet opening 32 which is connected to the inlet 47 of the cyclone 9 via a second part of the kiln gas duct 28. The material precipitated in the cyclone 18' may be directed to the kiln gas duct 28 upstream of the kiln gas inlet 31 via a material outlet duct 22'. In this case the second stream of pulverulent raw material is introduced into the retention chamber suspended in kiln exit gas. According to another embodiment the material precipitated in the cyclone 18' is discharged as a second stream of pulverulent raw material onto the sloping bottom of the retention chamber as a coherent stream via a material outlet duct 22''', and suspended in kiln gas in the retention chamber 29.

Figure 3:
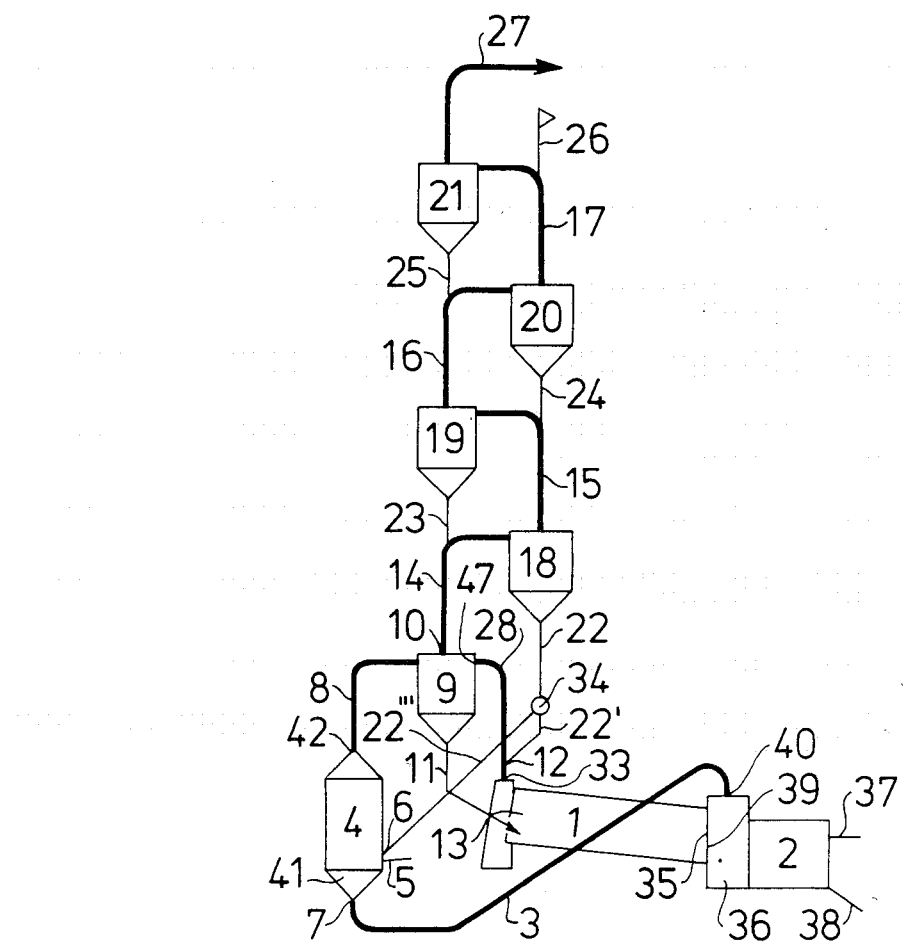

In the plant shown in FIG. 3, the preheated pulverulent raw material is divided into two streams by a dividing damper 34. The first stream of preheated pulverulent raw material is, via the material outlet duct 22 and a branch 22''', directed to the suspension burning chamber 4 which is constructed similarly to the burning chambers in FIGS. 1 and 2. The suspension transfer duct 8 from the burning chamber is connected to a first suspension inlet opening in the cyclone 9. The second stream of preheated pulverulent raw material is, via a branch 22' of the material outlet duct 22, introduced into a kiln gas duct 28 connected to another suspension inlet opening 47 in the cyclone 9.

In operation, the material is preheated in the preheater and divided into two streams by the dividing damper 34. The first stream is introduced into the suspension burning chamber 4 and the second stream is introduced into and suspended in kiln exhaust gas as described above. The two suspensions are united not in the kiln gas duct 28 but in the cyclone 9.

In the plant shown in FIGS. 1 and 2, the pulverulent raw material may be divided not by dividing the riser pipe 14, but by a dividing damper as shown in FIG. 3 and vice versa.

If it is desired to operate with a rather low temperature of the second stream of pulverulent raw material, the pulverulent raw material may be divided not in the last preheating step, but in one of the preceding steps. One stream is withdrawn from the preheater as the second stream of pulverulent raw material having a rather low temperature, the other strea being further preheated as the first stream of pulverulent raw material.

The number of cyclones in the preheaters may be larger or smaller than shown.

The introduction of the first stream of pulverulent raw material into the suspension burning chamber 4 may comprise division of the stream into two substreams, one being suspended in the oxygen containing gas before this gas is introduced through the bottom of the burning chamber, the other being introduced as a coherent stream on a sloping bottom of the burning chamber.

Additional heat may be provided by burning fuel in the kiln gas duct 28. In that case the duct will be provided with a supplementary fuel inlet 45 which, when the kiln gas duct 28 is provided with a retention chamber 29 as shown in FIG. 2, is preferably arranged at the bottom of the retention chamber.

The proportions of waste cooler air flowing through the pipe 3 and kiln 1 may be controlled by means of a throttle 44 in the kiln gas duct 28, or by means of a throttle 46 in the air pipe 3, as exemplified in FIGS. 1 and 2 respectively.

In FIGS. 1 and 2, a conventional plant not having the parts 18, 22, 8, 4 and 3 would be converted by the addition of these parts, and possibly in the case of FIG. 2, the part 29. In FIG. 3, the conversion would involve the addition of the parts 34, 22''', 3, 4 and 8. In each case the duct 28 is provided by the riser pipe in the unmodified plant.

I claim:

1. In an apparatus for burning pulverulent raw material, said apparatus comprising:
   (a) a preheater having a heating gas inlet, a heating gas outlet, a pulverulent raw material inlet, and first and second preheated raw material outlet ducts for first and second streams of preheated raw material respectively;
   (b) a suspension calciner assembly having a combustion gas inlet; a suspension burning chamber provided with inlets for fuel and hot air and with a preheated raw material inlet connected to said first duct of said preheater; a particle precipitator having a kiln gas suspension inlet, a calciner exhaust gas outlet connected to said heating gas inlet of said preheater, and a calcined material outlet duct; a kiln gas duct provided with a material inlet connected to said second duct of said preheater and connecting a kiln gas outlet with said gas suspension inlet of said particle precipitator; and a suspension transfer duct leading from said burning chamber to a sub-assembly comprising said kiln gas duct and said precipitator whereby, in use, said first and second material stream are reunited in suspension and precipitated together in said precipitator;
   (c) a kiln having an upper end with a material inlet connected to said calcined material outlet duct of said precipitator and a kiln gas exhaust outlet connected to said kiln gas duct, and a lower end with inlets for fuel and hot air and a burned material outlet; and, (d) a cooler having a material inlet connected to said lower kiln end, a cooling air inlet, a cooled material outlet, and first and second hot air outlets, connected respectively to said hot air inlet of said burning chamber and to said lower kiln end; the improvement wherein:

(e) said suspension transfer duct is connected to said sub-assembly of kiln gas duct and precipitator downstream of said material inlet of said kiln gas duct.

2. Apparatus according to claim 1, wherein said suspension burning chamber is a tubular chamber having an upright axis, an annular bottom wall sloping downwardly and inwardly with said central inlet for hot air in said bottom wall, said material inlet being mounted to discharge said first stream of material onto said bottom wall of said burning chamber, and a suspension outlet at the top of said burning chamber connected to said suspension transfer duct.

3. Apparatus according to claim 1, wherein said kiln gas duct is provided with a tubular retention chamber having an upright axis, an annular bottom wall sloping downwardly and inwardly, a central kiln gas inlet in said bottom wall, and a suspension outlet at the top of said retention chamber connected to said particle precipitator; wherein said material inlet opening of said kiln gas duct is located between said combustion gas outlet and said retention chamber or at a bottom of said retention chamber; and wherein said suspension transfer duct is connected to said kiln gas duct between said material inlet and said retention chamber or at a bottom of said retention chamber.

4. Apparatus according to claim 1, wherein said kiln gas duct is provided with a supplementary fuel inlet.

5. Apparatus according to claim 3, wherein said kiln gas duct is provided with a supplementary fuel inlet at a bottom of said retention chamber.

6. Apparatus according to claim 1, wherein said kiln gas duct is provided with a throttle.

* * * * *